US011111426B2

(12) United States Patent
Al-Otaibi et al.

(10) Patent No.: US 11,111,426 B2
(45) Date of Patent: Sep. 7, 2021

(54) IN-SITU SALINITY ADJUSTMENT TO IMPROVE WATERFLOODING PERFORMANCE IN OIL-WET CARBONATE RESERVOIRS

(71) Applicant: Saudi Arabian Oil Company, Dhahran (SA)

(72) Inventors: Mohammed Badri Al-Otaibi, Dhahran (SA); Dong Kyu Cha, Abqaiq (SA); Ali Abdallah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 190 days.

(21) Appl. No.: 16/424,098

(22) Filed: May 28, 2019

(65) Prior Publication Data

US 2019/0367801 A1  Dec. 5, 2019

Related U.S. Application Data

(60) Provisional application No. 62/677,968, filed on May 30, 2018.

(51) Int. Cl.
*E21B 43/20* (2006.01)
*C09K 8/588* (2006.01)

(52) U.S. Cl.
CPC .............. *C09K 8/588* (2013.01); *E21B 43/20* (2013.01)

(58) Field of Classification Search
CPC ................................ C09K 8/588; E21B 43/20
See application file for complete search history.

(56) References Cited

U.S. PATENT DOCUMENTS

| 4,460,627 A | * | 7/1984 | Weaver | ..................... C09K 8/50 427/212 |
| 4,534,783 A | * | 8/1985 | Beestman | .............. A01N 25/28 71/27 |
| 7,134,496 B2 | | 11/2006 | Jones et al. | |

(Continued)

FOREIGN PATENT DOCUMENTS

| CA | 2856785 A1 | 6/2013 |
| WO | WO2013089896 A1 | 6/2013 |
| WO | WO2016174414 A1 | 11/2016 |

OTHER PUBLICATIONS

International Search Report and Written Opinion for related PCT application PCT/US2019/034389 dated Jul. 29, 2019.

(Continued)

*Primary Examiner* — Silvana C Runyan
(74) *Attorney, Agent, or Firm* — Bracewell LLP; Constance G. Rhebergen; Kevin R. Tamm

(57) ABSTRACT

A composition for increased hydrocarbon production from a hydrocarbon-bearing reservoir. The composition includes a saltwater solution suitable for injection into the hydrocarbon-bearing reservoir for water flooding, the saltwater solution having a salinity; and a plurality of nanocapsules, where the nanocapsules are operable to be suspended amongst the saltwater solution, where the nanocapsules have an overall positively charged outer surface at respective outer shells of the nanocapsules, where the nanocapsules encapsulate water molecules within the nanocapsules, and where the nanocapsules are operable to release the water molecules in the hydrocarbon-bearing reservoir proximate overall negatively charged zones.

20 Claims, 2 Drawing Sheets

(56) References Cited

U.S. PATENT DOCUMENTS

| | | |
|---|---|---|
| 8,356,667 B2 | 1/2013 | Quintero et al. |
| 8,415,279 B2 | 4/2013 | Quintero et al. |
| 8,431,620 B2 | 4/2013 | Del Gaudio et al. |
| 9,222,013 B1 | 12/2015 | Champagne et al. |
| 9,556,376 B2 | 1/2017 | Huang et al. |
| 9,714,389 B2 | 7/2017 | See et al. |
| 2008/0269083 A1* | 10/2008 | Argillier ............ C09K 8/528 507/219 |
| 2010/0267594 A1 | 10/2010 | Rana et al. |
| 2012/0160497 A1 | 6/2012 | Varadaraj et al. |
| 2012/0199517 A1 | 8/2012 | Del Gaudio et al. |
| 2012/0261120 A1 | 10/2012 | Del Gaudio et al. |
| 2013/0079255 A1 | 3/2013 | Del Gaudio et al. |
| 2013/0133886 A1 | 5/2013 | Quintero |
| 2013/0327524 A1 | 12/2013 | Sangermano et al. |
| 2016/0272873 A1* | 9/2016 | Mahadevan ............ C09K 8/58 |
| 2016/0298022 A1 | 10/2016 | Chang |
| 2016/0340569 A1 | 11/2016 | Belcher et al. |
| 2016/0367705 A1 | 12/2016 | Walters |
| 2017/0044884 A1 | 2/2017 | Mahmoud et al. |
| 2018/0298274 A1* | 10/2018 | Zhao ..................... C09K 8/54 |

OTHER PUBLICATIONS

Samuel, et al. "Design and Development of Aqueous Colloidal Gas Aphrons for Enhanced Oil Recovery Applications." SPE 154518 Improved Oil Recovery Symposium. 2012. (pp. 1-8).

* cited by examiner

IN-SITU SALINITY ADJUSTMENT TO IMPROVE WATERFLOODING PERFORMANCE IN OIL-WET CARBONATE RESERVOIRS

CROSS-REFERENCE TO RELATED APPLICATION

This application is a non-provisional application of and claims priority to and the benefit of provisional application Ser. No. 62/677,968, filed May 30, 2018.

BACKGROUND

Field

The disclosure relates generally to enhanced hydrocarbon recovery from a hydrocarbon-bearing reservoir. More specifically, the disclosure relates to improved saltwater flooding of a hydrocarbon-bearing reservoir for improved hydrocarbon recovery.

Description of the Related Art

Salt water, for example seawater, reservoir flooding has been applied in different oil fields throughout the world. The salt water is injected mainly to increase reservoir pressure and subsequently displace oil from reservoirs towards one or more production wells. Reducing the salinity of seawater can favorably impact the wettability of hydrocarbon-bearing reservoirs, such as for example carbonate reservoirs, and ultimately increase oil recovery. Limitations of conventional methods of seawater flooding include an increase in salinity with time due in part to calcite dissolution in the reservoir. In addition, seawater can require a desalination process to reduce the salinity to a level that enhances interactions with rock mineral and oil components.

SUMMARY

Embodiments of the disclosure include unique compositions of and methods for injecting encapsulated water molecules along with seawater to gradually reduce salinity of a hydrocarbon-bearing reservoir in situ. In some embodiments, encapsulated water molecules can be activated or released only in oil-wet areas of a hydrocarbon-bearing reservoir through surface charge mechanisms. In addition, in some embodiments the encapsulated water molecules are inert and pass by and through water-wet areas of a hydrocarbon-bearing reservoir, such as for example water-wet reservoir rocks.

Embodiments of the technology enable adjusting the salinity of the reservoir in situ to enhance fluid/rock interactions and ultimately reduce residual oil saturation. Embodiments of the disclosure reduce cost of desalination processes for decreasing the salinity of produced water or seawater. In addition, embodiments dilute formation brine in situ only in targeted oil-wet areas. Embodiments of the disclosure include special purpose capsules, for example microcapsules or nanocapsules, that will not react with or be attracted to water-wet rock to avoid any further increase in the salinity with time.

Increasing salinity within hydrocarbon-bearing reservoirs can diminish interactions of brine with carbonate minerals and oil components. As a result, more oil is left behind in the reservoir. Compositions and methods of the present disclosure can target only oil-wet rock without interacting with water-wet areas within a reservoir. Compositions and methods of the disclosure are improved since certain areas in a reservoir can be targeted, and water molecules are released in the pores or proximate the pores of oil-bearing rock. Compositions and methods of the disclosure create in situ dilution with respect to the reservoir brines substantially only in oil-wet areas.

Briefly, in hydrocarbon-bearing rock reservoirs such as for example carbonate reservoirs, changing the surface charge of rocks from oil-wetting to water-wetting can be advantageous to drive oil production out of the rocks and reservoir. Oil-wet (oil bearing) carbonate rocks can have an overall negative charge associated with them at the outer interface, as shown in the Figures and described with more detail as follows, and oppositely certain carbonate rocks can have an overall positive charge at the outer interface. Seawater is commonly injected into such reservoirs, and the disclosure shows that reducing the salinity of the seawater with $H_2O$-bearing nano-capsules having a positively charged outer shell can aid in producing oil from oil-bearing carbonate rock.

Embodiments described here include nano-encapsulated water, the capsules having a positive charge on the outer shell, to alter rock wettability in a reservoir from oil-wetting to water-wetting to release oil from rock, such as for example carbonate rock, and increase hydrocarbon production. Embodiments reduce the water salinity in the oil-wet zones in situ through encapsulation of water molecules. Compositions and methods release water molecules only in certain oil-wet areas of a reservoir.

Therefore, disclosed here is a composition for increased hydrocarbon production from a hydrocarbon-bearing reservoir, the composition including a saltwater solution suitable for injection into the hydrocarbon-bearing reservoir for water flooding, the saltwater solution having a salinity; and a plurality of nanocapsules, where the nanocapsules are operable to be suspended amongst the saltwater solution, where the nanocapsules have an overall positively charged outer surface at respective outer shells of the nanocapsules, where the nanocapsules encapsulate water molecules within the nanocapsules, and where the nanocapsules are operable to release the water molecules in the hydrocarbon-bearing reservoir proximate overall negatively charged zones.

In some embodiments, the outer shells comprise a polymeric material to provide the overall positively charged outer surface. In other embodiments, the outer shells comprise a resin material to provide the overall positively charged outer surface. Still in other embodiments, the outer shells comprise a moiety grafted to the outer shells to provide the overall positively charged outer surface. Still in other embodiments, the outer shells comprise a moiety adsorbed to the outer shells to provide the overall positively charged outer surface. In certain embodiments, the nanocapsules are operable to release the water molecules in the hydrocarbon-bearing reservoir proximate overall negatively charged zones comprising oil or natural gas. Still in other embodiments, the plurality of nanocapsules are present in the composition in an amount operable to release an amount of water molecules such that salinity in an area of release decreases, and surface charge of a rock is changed from positive to negative to drive out an overall negatively charged oil layer proximate the rock.

In certain embodiments, the overall positively charged outer surface is suitable to prevent the plurality of nanocapsules from releasing the water molecules near an overall positively charged zone in the hydrocarbon-bearing reservoir. Still in other embodiments, the overall positively charged zone in the reservoir comprises water-wet carbonate rock. In certain embodiments, the nanocapsules are operable to release the water molecules in the hydrocarbon-bearing reservoir proximate overall negatively charged zones comprising a carboxylate group. In certain embodiments, the saltwater solution comprises seawater.

Additionally disclosed is a method for increasing hydrocarbon production from a hydrocarbon-bearing reservoir, the method including the steps of: preparing a saltwater solution suitable for injection into the hydrocarbon-bearing reservoir for water flooding, the saltwater solution having a salinity; adding to the saltwater solution a plurality of nanocapsules to form an enhanced recovery suspension, where the nanocapsules are operable to be suspended amongst the saltwater solution, where the nanocapsules have an overall positively charged outer surface at respective outer shells of the nanocapsules, where the nanocapsules encapsulate water molecules within the nanocapsules, and where the nanocapsules are operable to release the water molecules in the hydrocarbon-bearing reservoir proximate overall negatively charged zones; and injecting the enhanced recovery suspension into the hydrocarbon-bearing reservoir to increase hydrocarbon production.

In some embodiments, the outer shells comprise a polymeric material to provide the overall positively charged outer surface. Still in other embodiments, the outer shells comprise a resin material to provide the overall positively charged outer surface. In some embodiments of the method, the method includes a step of grafting a moiety to the outer shells to provide the overall positively charged outer surface. Still in other embodiments, the nanocapsules are operable to release the water molecules in the hydrocarbon-bearing reservoir proximate overall negatively charged zones comprising oil or natural gas. In certain embodiments, the step of adding includes adding the plurality of nanocapsules in an amount operable to release an amount of water molecules such that salinity in an area of release decreases, and surface charge of a rock is changed from positive to negative to drive out an overall negatively charged oil layer proximate the rock.

Still in other embodiments, the overall positively charged outer surface is suitable to prevent the plurality of nanocapsules from releasing the water molecules near an overall positively charged zone in the hydrocarbon-bearing reservoir. In certain embodiments, the overall positively charged zone in the reservoir comprises water-wet carbonate rock. In other embodiments, the nanocapsules are operable to release the water molecules in the hydrocarbon-bearing reservoir proximate overall negatively charged zones comprising a carboxylate group. Still in another embodiment, the saltwater solution comprises seawater.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions for and methods of in situ salinity adjustment, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
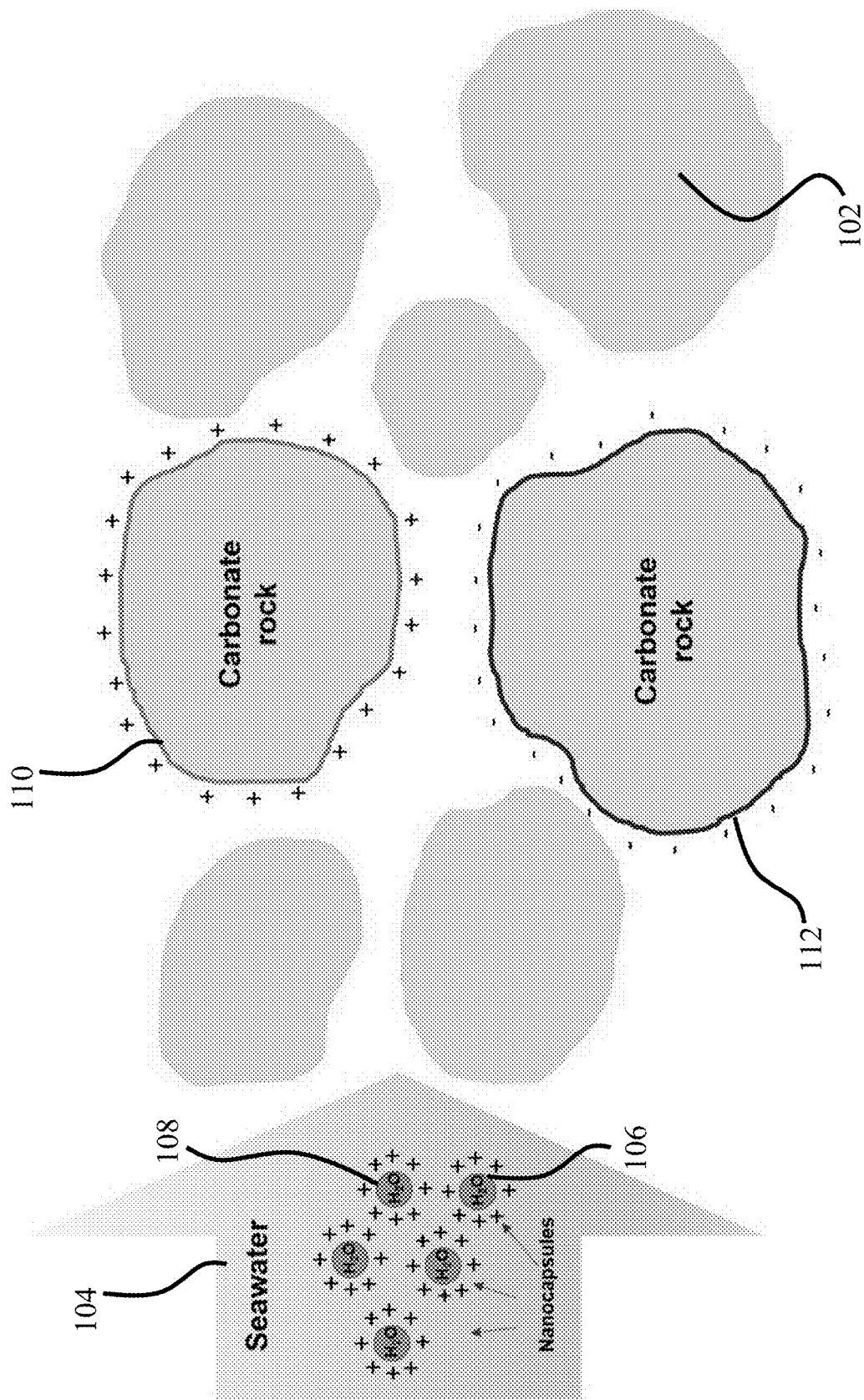
FIG. 1 is a schematic representation of nanoencapsulated water molecules being used with seawater to enhance production from an oil-bearing carbonate reservoir.

Referring first to FIG. 1, a schematic representation is provided of nanoencapsulated water molecules being used with seawater to enhance production from an oil-bearing carbonate reservoir. In hydrocarbon-bearing reservoir 100, for example including carbonate rocks 102, seawater 104 can be injected to drive remaining oily layers, such as for example oily layer 112, toward production wells of the reservoir (not pictured). Seawater 104 includes nanoencapsulated water 106, and the nanoencapsulated water 106 includes positively charged outer shells 108.

Positively charged outer shells 108 of nanoencapsulated water 106 repels other positive charges, for example positive charges around water-wet carbonate rock 110 (optionally having increased salinity), and thus the nanoencapsulated water 106 is drawn toward areas with an overall negative charge, for example oily layer 112.

In hydrocarbon-bearing rock reservoirs such as for example carbonate reservoirs, changing the surface charge of rocks from oil-wetting to water-wetting can be advantageous to drive oil production out of the rocks and reservoir. Oil-wet (oil bearing) carbonate rocks can have an overall negative charge associated with them at the outer interface, as shown in FIG. 1 at 112, and oppositely certain carbonate rocks can have an overall positive charge at the outer interface, for example at 110. Seawater is commonly injected into such reservoirs, and the disclosure shows that reducing the salinity of the seawater with $H_2O$-bearing nano-capsules having a positively charged outer shell, in the proximity of a negatively charged oily layer, can aid in producing oil from oil-bearing carbonate rock. Wettability of rocks can be measured via changes in the contact angle from, for example 10° (strong water wetting) to 115°, which is non-wetting for water or preferentially gas/hydrocarbon wetting.

Wettability alteration chemicals can alter the wettability of surfaces of a hydrocarbon-bearing reservoir. Wettability is the degree of wetting, or the degree to which a liquid maintains contact with a surface and is a function of cohesive and adhesive forces. Different surfaces have different wettabilities for different liquids. A liquid wettable surface is one where a drop of fluid on the surface spreads out along the surface. A liquid non-wettable surface is one where a drop of fluid on the surface stays as a drop of fluid. Wettability alteration chemicals can alter the contact angle between the liquid phases and rock surfaces to values that make the rock surface preferentially wetted by so that hydrocarbon or water is expelled. Wettability alteration chemicals can also lower the surface tension of the liquids.

Therefore the wettability alteration chemicals can change the reservoir surfaces from a liquid wet condition, such as water wet or oil wet, to an intermediate wet with liquid, or gas wet condition. An intermediate wet condition, such as an intermediate wet with liquid condition, is between a water or oil-wet and a gas-wet condition in which some surface or grains are water or oil-wet and others are gas-wet. Wettability alteration chemicals allow for more production of both liquids and gasses and result in an increase in recovery and revenue from the hydrocarbon-bearing reservoir.

Figure 2:
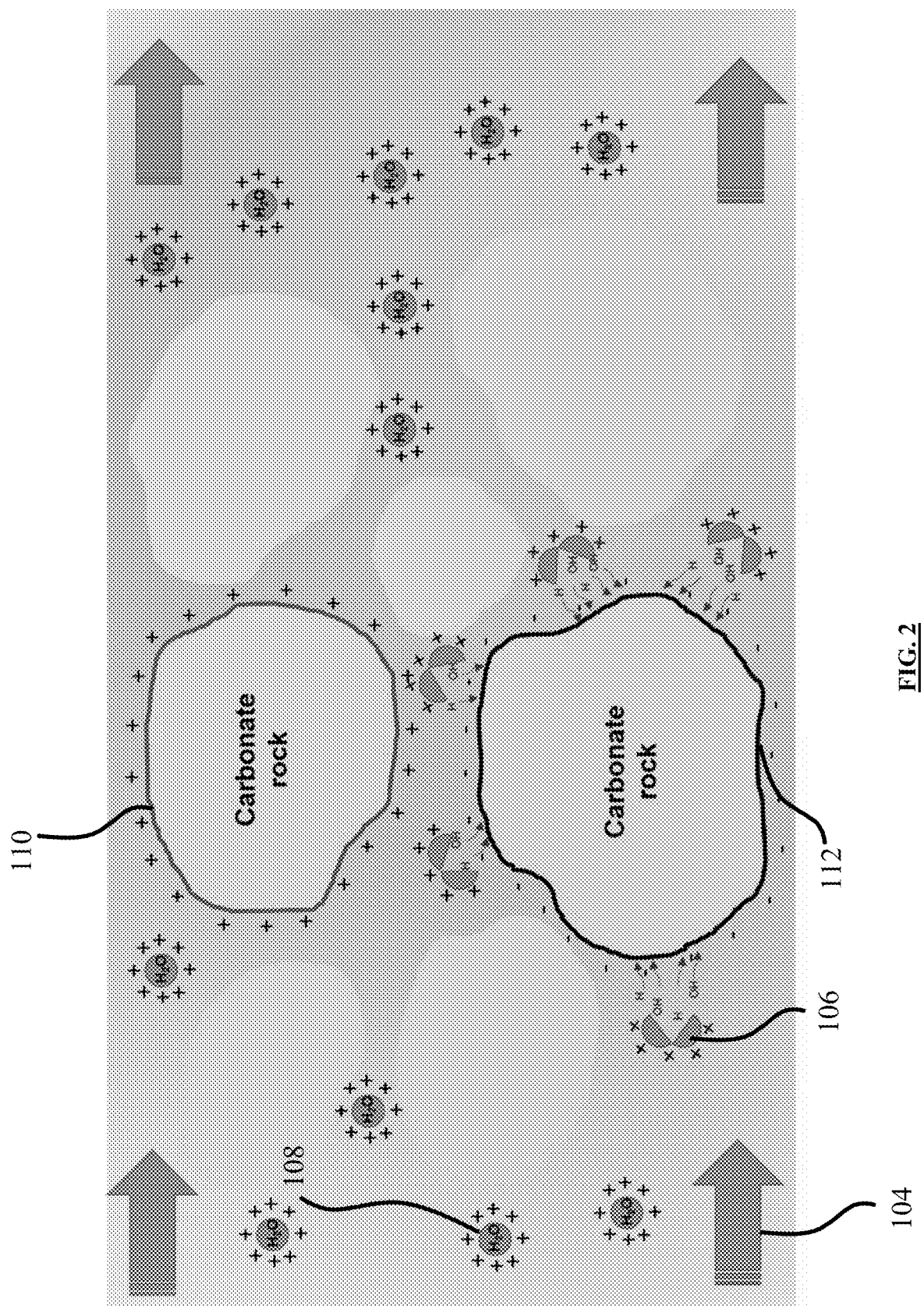
FIG. 2 is a schematic representation of nanoencapsulated water molecules interacting with carbonate rock to enhance production from an oil-bearing carbonate reservoir.

Referring now to FIG. 2, a schematic representation is provided of nanoencapsulated water molecules interacting with carbonate rock to enhance production from an oil-bearing carbonate reservoir. As positively charged outer shells 108 of nanoencapsulated water 106 are attracted to oily layer 112 and the associated negative charge, the nanoencapsulated water 106 releases water molecules proximate the overall negative charge at oily layer 112. Polymeric, resin, or other degradable materials used in the nanocapsule walls are designed to break down in situ when positioned in an area with opposite charge for a given amount of time, for example about 1 minute, about 30 minutes, about 1 hour, or about 2 hours. Timing of the shell break down depends on for example shell material, shell thickness, reservoir temperature, and reservoir pressure.

Water-bearing nanocapsules with a positively charged outer shell are attracted in situ to oil-wetting (oil bearing) carbonate rock that is overall negatively charged at the outer interface, and when the nano-capsules contact (adsorb to) the overall negatively charged carbonate rock with oil and release the encapsulated water, the salinity in the area (proximate pores) is reduced. Over time, the carbonate rock itself can become negatively charged, and repulse the overall negatively charged oil, driving oil production out of the reservoir toward production wells. In other words, the nanoencapsulated water alters the rock from oil-wetting to water-wetting.

Saltwater flooding with encapsulated water allows delivery of optimum saline water to oil-wet zones only. The capsule of the encapsulated water carries an overall external positive charge to avoid any chemical interactions with overall positively charged water-wet rock minerals, for example positively charged outer shells 108 would repel from positively charged water-wet (for example high salinity) carbonate rock 110. Thereby, the capsules are attracted only by the negatively charged oil-wet surfaces and oil droplets. Certain negatively charged oil components, for example carboxylate groups (—COOH), usually influence the overall charge of oil-wet carbonate rock.

The injected water capsules are only delivered to the targeted oil-wet areas through surface charge mechanisms. Afterwards, capsules adsorb on oil-wet rock surfaces and rapidly release water molecules in situ, for example by delayed dissolution, degradation, and/or reaction. Salinity proximate to and within porous areas will be subsequently reduced to a level that can alter the rock charges towards the negative side. As a result, rock wettability will be favorably altered towards water-wet condition and drive oil away from the rock layers in a reservoir. Water within the nanocapsules can include seawater or water without salt/minerals.

One example method of the present disclosure can include the following steps. First, nanocapsules in addition to or alternative to microcapsules are prepared that include water molecules inside. For example, suitable capsules could be prepared via an interfacial polycondensation reaction encapsulating water. Suitable capsules may be formed between a first co-monomer and second co-monomer, for example triethylene tetramine and an isocyanate.

The outer surface of the capsules are made of appropriate polymeric or resin materials that are positively charged. In addition or alternatively, the outer surface of the capsules can be functionalized, for example with a polycation, to enact and/or enhance a positive outer charge. Next, the nanocapsules in addition to or alternative to microcapsules are mixed with seawater before an injection stage. The capsules will target only the oil components or the adsorbed oil film on the rock surface in situ. Nanocapsules adsorb on the oily wet areas and then release water molecules in-situ, for example as the capsule dissolves, degrades, and/or reacts. The salinity in the proximate area of the pores will be ultimately decreased with time. Adjustment in the salinity will consequently alter the carbonate rock surface charge to negative. The release of water from the capsules can be controlled by modifying the thickness of the capsule shell in addition to or alternative to the speed with which the shell of the nanocapsules reacts or dissolves in situ.

Adsorbed oil films are released due to the modification on the rock surface charges, which creates repulsion between carbonate minerals and adsorbed oil components. Salinity is reduced in situ in oil-wet areas only, which ultimately reduces the residual oil saturation and alters rock wettability towards water-wet.

Embodiments of compositions and methods decrease the salinity in situ in the oil-wet areas only. This will increase oil recovery and reduce residual oil saturation accordingly. It will also minimize the interaction of fresh water with the water-wet rock, since that interaction eventually increases salinity due to the dissolution of calcite with time.

The singular forms "a," "an," and "the" include plural referents, unless the context clearly dictates otherwise.

The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A composition for increased hydrocarbon production from a hydrocarbon-bearing reservoir, the composition comprising:
   a saltwater solution suitable for injection into the hydrocarbon-bearing reservoir for water flooding, the saltwater solution having a salinity; and
   a plurality of nanocapsules, where the nanocapsules are operable to be suspended amongst the saltwater solution, where the nanocapsules have an overall positively charged outer surface at respective outer shells of the nanocapsules, where the nanocapsules encapsulate water molecules without salt or minerals within the nanocapsules, and where the nanocapsules are operable to release the water molecules in the hydrocarbon-bearing reservoir proximate overall negatively charged zones to reduce salinity and alter wettability via release of water molecules in situ proximate an area of release.

2. The composition of claim 1, where the outer shells comprise a polymeric material to provide the overall positively charged outer surface.

3. The composition of claim 1, where the outer shells comprise a resin material to provide the overall positively charged outer surface.

4. The composition of claim 1, where the outer shells comprise a moiety grafted to the outer shells to provide the overall positively charged outer surface.

5. The composition of claim 1, where the nanocapsules are operable to release the water molecules in the hydrocarbon-bearing reservoir proximate overall negatively charged zones comprising oil or natural gas.

6. The composition of claim 1, wherein the plurality of nanocapsules are present in the composition in an amount operable to release an amount of water molecules wherein surface charge of a rock is changed from positive to negative to drive out an overall negatively charged oil layer proximate the rock.

7. The composition of claim 1, where the overall positively charged outer surface is suitable to prevent the plurality of nanocapsules from releasing the water molecules near an overall positively charged zone in the hydrocarbon-bearing reservoir.

8. The composition of claim 7, where the overall positively charged zone in the reservoir comprises water-wet carbonate rock.

9. The composition of claim 1, where the nanocapsules are operable to release the water molecules in the hydrocarbon-bearing reservoir proximate overall negatively charged zones comprising a carboxylate group.

10. The composition of claim 1, where the saltwater solution comprises seawater.

11. A method for increasing hydrocarbon production from a hydrocarbon-bearing reservoir, the method comprising the steps of:
preparing a saltwater solution suitable for injection into the hydrocarbon-bearing reservoir for water flooding, the saltwater solution having a salinity;
adding to the saltwater solution a plurality of nanocapsules to form an enhanced recovery suspension, where the nanocapsules are operable to be suspended amongst the saltwater solution, where the nanocapsules have an overall positively charged outer surface at respective outer shells of the nanocapsules, where the nanocapsules encapsulate water molecules without salt or minerals within the nanocapsules, and where the nanocapsules are operable to release the water molecules in the hydrocarbon-bearing reservoir proximate overall negatively charged zones to reduce salinity and alter wettability via release of water molecules in situ proximate an area of release; and
injecting the enhanced recovery suspension into the hydrocarbon-bearing reservoir to increase hydrocarbon production.

12. The method of claim 11, where the outer shells comprise a polymeric material to provide the overall positively charged outer surface.

13. The method of claim 11, where the outer shells comprise a resin material to provide the overall positively charged outer surface.

14. The method of claim 11, further comprising the step of grafting a moiety to the outer shells to provide the overall positively charged outer surface.

15. The method of claim 11, where the nanocapsules are operable to release the water molecules in the hydrocarbon-bearing reservoir proximate overall negatively charged zones comprising oil or natural gas.

16. The method of claim 11, where the step of adding includes adding the plurality of nanocapsules in an amount operable to release an amount of water molecules wherein surface charge of a rock is changed from positive to negative to drive out an overall negatively charged oil layer proximate the rock.

17. The method of claim 11, where the overall positively charged outer surface is suitable to prevent the plurality of nanocapsules from releasing the water molecules near an overall positively charged zone in the hydrocarbon-bearing reservoir.

18. The method of claim 17, where the overall positively charged zone in the reservoir comprises water-wet carbonate rock.

19. The method of claim 11, where the nanocapsules are operable to release the water molecules in the hydrocarbon-bearing reservoir proximate overall negatively charged zones comprising a carboxylate group.

20. The method of claim 11, where the saltwater solution comprises seawater.

* * * * *